United States Patent Office 3,088,274
Patented May 7, 1963

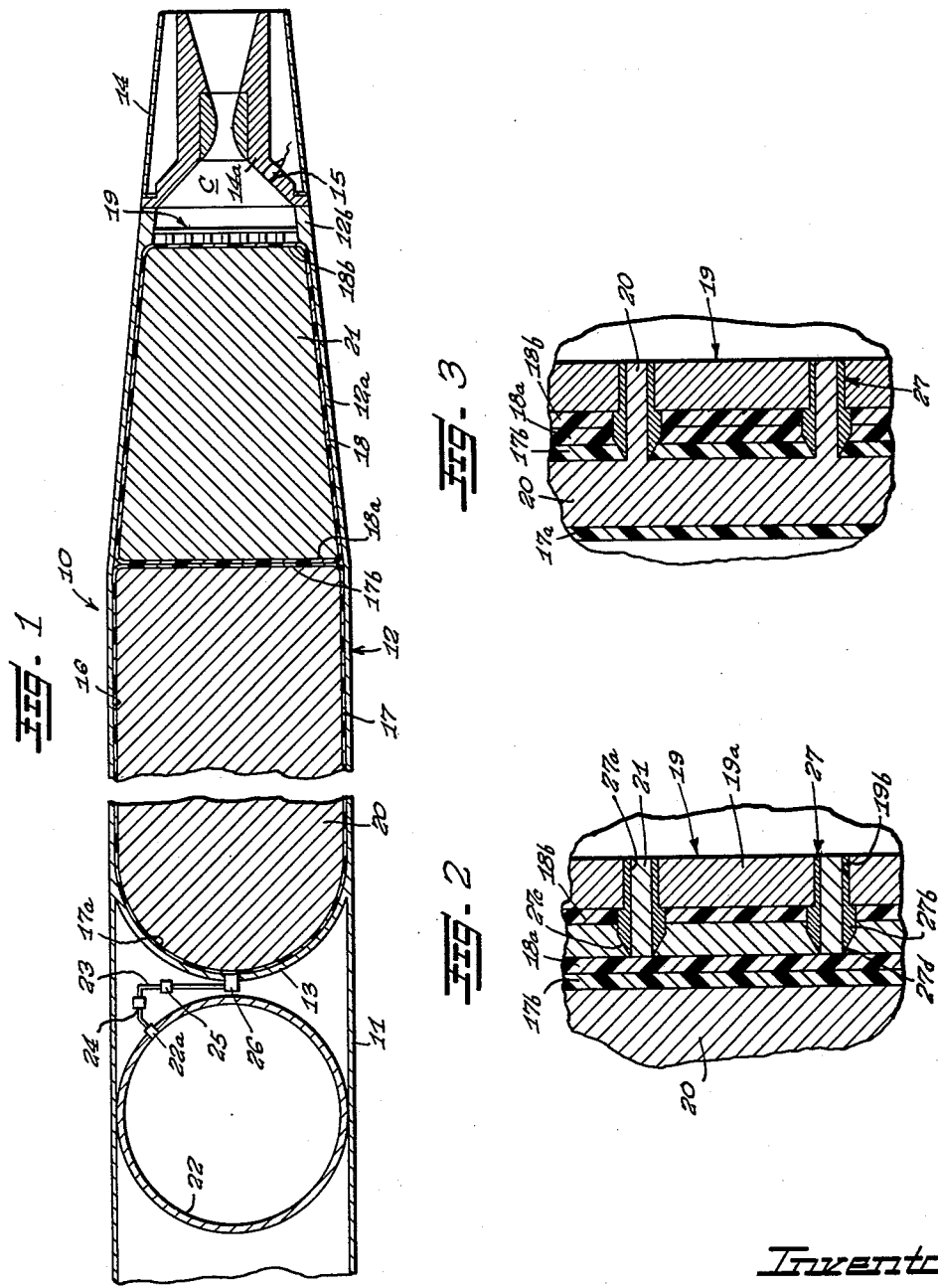

3,088,274
DUAL THRUST ROCKET ENGINE
Roy A. McKinnon and Hubert P. Smreker, Cleveland, Ohio, assignors to Thompson Ramo Wooldridge, Inc., Cleveland, Ohio, a corporation of Ohio
Filed Oct. 19, 1959, Ser. No. 847,215
4 Claims. (Cl. 60—35.6)

The present invention relates broadly to rocket engines, and is more particularly concerned with a power plant for missile and related applications having among the features thereof the provision of a short duration-high thrust succeeded by a long duration-low thrust.

It is an important aim of the present invention to provide a rocket engine housing in the fuel chamber thereof a plurality of sources of monopropellants of different energy values and sequentially ignited, whereby the vehicle carrying said engine may climb to altitude using the high thrust monopropellant and may then go to cruise employing the lower thrust monopropellant.

Another object of this invention lies in the provision of a power plant burning gel fuels having different thrust-producing characteristics, the consumption of each fuel being accurately modulated to control transition of the vehicle from climb to cruise.

Another object of the instant invention is to provide a rocket engine and a plurality of fuel sources within said engine housed in separate puncturable fuel cells, and wherein the rocket engine embodies a fuel flow splitter provided with projections effective to pierce each of the fuel cells upon movement thereagainst.

A further object of the present invention lies in the provision of a rocket engine of the foregoing character for missile applications, and which embodies therein a pressurized gas source to direct the puncturable fuel cells against the fuel flow splitter means, the pressure applied by said gas to the fuel cells being controlled to a programmed value to provide a constant fuel consumption, so that the time when the missile proceeds from high thrust to low thrust is accurately determined by the quantity of fuel in the high energy fuel cell.

Other objects and advantages of the invention will become more apparent during the course of the following description, particularly when taken in connection with the accompanying drawings.

In the drawings, wherein like numerals designate like parts throughout the same:

FIGURE 1 is a sectional view through a rocket engine constructed in accordance with the principles of this invention, and showing the arrangement of high and low energy fuel sources therein;

FIGURE 2 is a fragmentary detail sectional view through the fuel flow splitter means, and illustrating the action of the projections on said splitter means to pierce a first wall of one of the fuel cells; and FIGURE 3 is a view similar to FIGURE 1, and showing the position of two walls of the high energy fuel cell and a first or rear wall of the low energy fuel cell with respect to the projections on the fuel flow splitter means.

Briefly stated, a rocket engine embodying the novel concepts of this invention incorporates a perforated fuel splitter plate between the fuel chamber and the nozzle assembly of the rocket engine, the splitter plate mounting relatively short tubular inserts in the openings thereof to project from the fuel container side of the plate and to provide piercing edges. The tubular inserts may be beveled so that their projecting rims are relatively sharp.

As disclosed herein, the fuel chamber is charged with a first bag of high energy fuel adjacent the fuel splitter plate, and the first bag is backed by a second bag of low energy fuel. Propelling fluid from a high pressure bottle or other source in the rocket engine is introduced into the fuel chamber behind the low energy or second fuel bag. The propelling fluid forces the bags toward the fuel splitter, and the rearward wall or aft face of the high energy fuel bag is first pierced by the sharp rim edges of the tubular inserts in the splitter plate. When the contents of the high energy fuel bag are exhausted, the forward wall of this bag and the rearward wall of the low energy fuel bag are next pierced in sequence by the sharpened rim edges of the inserts.

By the structure and arrangement of this invention, the rocket engine possesses the important ability to provide a high thrust for a relatively short period of time, succeeded by a low thrust for a relatively longer period. As a result, the missile can climb to altitude using a high thrust fuel, and then cruise using a lower thrust fuel. While other advantages are apparent, there results from this invention substantial fuel economies and marked weight savings.

Referring now to the drawings, there is shown in FIGURE 1 a rocket engine generally designated by the numeral 10 and comprising a forward housing 11 and integral rearward housing 12 separated by an arcuately curved bulkhead or wall 13. The rocket engine 10 is generally cylindrical and of uniform diameter, although the aft housing 12 may have a convergent portion 12a mounting at one end a convergent nozzle assembly 14. The nozzle assembly 14 may take any one of many forms known to the art, and interiorly thereof may mount a venturi throat portion 14a supporting ignition means 15 suitably provided by a squib starter or the like, and by means of which fuel is ignited in a combustion chamber C.

The aft housing 12 defines therewithin a fuel chamber 16 and located within said chamber is a plurality of fuel cells 17 and 18, two of which are shown in the illustrative embodiment of the invention. Each cell 17 and 18 may take the form of a closed plastic bag, and film materials as exemplified by polyethylene are satisfactory. It may be seen from FIGURE 1 that the bag 17 has a forward wall 17a generally coextensive with the bulkhead 13, and a rearward wall 17b lying substantially flush with a forward wall 18a of the fuel cell 18. The aft fuel cell 18 is further provided with a rearward wall 18b positioned, prior to ignition of the rocket engine 10, closely adjacent a fuel flow splitter means 19, the structural features of which will be later described.

The forward fuel bag 17 houses a relatively low energy thixotropic monopropellant 20, while the aft fuel cell 18 contains a relatively high energy thixotropic monopropellant 21. Each of the monopropellants 20 and 21 is in gelatinous form, and any of the known gel fuels are satisfactory when fulfilling at least the requirements of sufficiently high cohesive strength and extrudability at ambient temperatures. The property of sufficient cohesion is important in order that the fuel may retain its shape for an appreciable length of time after extrusion, and further, be able to withstand fragmentation under given conditions in the combustion chamber, so that material is not vented from the nozzle assembly under high acceleration conditions.

The instant invention is not directly concerned with specific fuel compositions, although compounds exemplified by hydrazine nitrate, nitromethane or ethylene oxide with suitable gelling agents are satisfactory. Further, the propellant may be of the double-base type, and illustrative of such substances are nitrocellulose gelatinized with nitroglycerine, and preferably also containing an inert, non-volatile plasticizer such as triacetine, diethyl phthalate, dibutyl phthalate or dibutyl sebacate. In addition, there may be employed pentaerythritol trinitrate, 1,2,4-butanetrinal trinitrate, or diethylene-glycol dinitrate, gelatinized with nitroglycerine, and either with or without a suitable plasticizer. In the named monopropellants, additives may be employed such as ammonium, sodium or potassium perchlorates and nitrates. Any of the named monopropellants may be modified in a manner known to the art to produce particular thrust characteristics, and to provide high energy and low energy fuels 20 and 21, respectively.

The forward housing 11 of the rocket engine 10 contains therewithin a vessel or chamber 22, and preferably housing a gas as exemplified by nitrogen. The tank 22 may be of spherical configuration, and is constructed with high pressure capabilities. The pressure bottle or vessel 22 is apertured to receive a fitting 22a connecting with a conduit 23 mounting a valve unit 24 providing fill, vent and start functions. Within the conduit 23 there is further located a modulating control valve 25, and said conduit terminates in a fitting 26 supported in a suitable aperture in the bulkhead 13. The valve units 24 and 25 may take any one of a number of different forms known to the art. As will later be described in detail, admission of nitrogen gas from the bottle 22 to the interior of the fuel chamber 16 and against the forward wall 17a of the fuel bag 17 causes movement of the fuel bags 17 and 18, and upon puncturing thereof, ejection of the gel fuels 21 and 20 sequentially from the fuel flow splitter plate 19, now to be described.

The fuel flow splitter plate 19 is supported by an annular tail portion 12b of the aft housing 12, and comprises a generally circular mounting portion 19a provided with a plurality of spaced openings or apertures 19b therein. The apertures 19b may be seen to extend entirely through the mounting plate 19a, and received within each aperture is a tubular insert 27.

Each tubular insert 27 is formed with a generally cylindrical stem portion 27a integral with an enlarged head portion 27b tapered as at 27c to provide relatively sharp piercing surfaces 27d. As will be noted in connection with a description of the operation of the rocket engine 10, the axial length of the head portion 27b of each insert 27 is calculated to generally correspond with the thicknesses of the end walls 18b, 18a and 17b of the fuel cells 17 and 18, respectively.

The fuel bags 17 and 18 are loaded with monopropellant 20 and 21 in a quantity measured by the anticipated range of the missile (not shown) driven by the rocket engine 10. Specifically, by calculating the quantity of high energy fuel 21, the duration of time within which the missile will climb to altitude is readily controlled, and in addition, the quantity of low energy fuel 20 will of course determine the duration of the cruise following climb to altitude. The rate of consumption of high energy fuel 21 is controlled in accordance with this invention by careful regulation of the volume of gas ported from the pressure bottle 22, and it will therefore now be apparent that control of quantity of the high energy fuel 21 and regulation of the gas pressures admitted from the vessel 22 to the fuel chamber 16 provide a constant fuel consumption and determine the capabilities of the missile insofar as altitude is concerned.

Opening of the valve unit 24 to a start position and adjustment of the modulating valve 25 to a particular pressure exerts a force upon the forward wall 17a of the low energy fuel 20 to the forward and rear walls 17b and 18a of the fuel cells 17 and 18, respectively. The existence of sufficient pressures causes the rearward wall 18b of the fuel bag 18 to be driven against the relatively sharp surfaces 27d of the tubular inserts 27 to puncture or pierce the rearward wall 18b in generally the manner of FIGURE 2. High energy fuel 21 within said fuel cell 18 is thereupon extruded through the tubular inserts 27 and the shaped columns of gelled fuel are ignited by the ignition means 15. A self-sustained combustion then exists, and further pressures from the vessel 22 causes continued extrusion of the high energy fuel 21, until ultimately the fuel bag 18 is essentially collapsed, as shown in FIGURE 3. Continued pressures from the vessel 22 essentially entirely collapse the fuel bag 18 until the walls 18b and 18a thereof contact one another and are driven on the enlarged head portion 27b of the inserts 27. This is illustrated in FIGURE 3, which additionally shows the rearward wall 17b of the fuel bag 17 upon the tubular insert head portions, which is the condition existing under complete collapse of the fuel cell 18 and exertion of continued pressures upon the fuel bag 17. By reason of said pressures, low energy fuel 20 in the fuel bag 17 is extruded by the tubular inserts 27 into the form of shaped columns, which are ignited by the sustained combustion in the nozzle assembly 14.

It may now be seen that applicants have provided a rocket engine of relatively light weight and featuring dual thrust capabilities having particular importance for special guided missile applications. The engine herein disclosed possesses the ability to provide a high thrust for a short period of time, succeeded by a low thrust for a relatively longer period. Thereby, the missile is enabled to climb to altitude using the high thrust fuel, and to then use a lower thrust fuel for cruising. As noted, the structure herein disclosed has among its important advantages substantial fuel economies and marked weight savings. The rocket engine of this invention may employ any of the known gelatinous monopropellants, and the specification has pointed out exemplary compositions which are satisfactory for the instant purposes. The high and low energy fuels are effectively extruded by the splitter plate disclosed, and this plate has the further feature of effectively puncturing the flexible fuel bag to permit extrusion of the fuel under action of gas pressures from the vessel 22. A modulated flow rate is thereby provided which in turn permits a constant fuel consumption, so that the time when the missile goes from high thrust to cruise can be readily and accurately determined by the amount of propellant in the high energy fuel bag.

Various changes and modifications may be effected in the structures herein disclosed without departing from the novel concepts of the present invention.

We claim as our invention:

1. A power plant, which comprises a housing, a plurality of relatively flexible propellant cells slidably received in said housing for separately containing gelatinous propellants of relatively high and relatively lower energy values, stationary propellant flow splitter means secured to said housing interiorly thereof and provided with relatively sharp tubular surfaces facing inwardly toward said fuel cells for puncturing said cells, and force applying means in said housing for exerting a force against said propellant cells to move first one cell and then another cell against the tubular surfaces on said splitter means whereupon said cells are sequentially punctured and the propellants therein directed through said splitter means in shaped columns for ignition, the relatively high energy propellant being first ignited and providing a short duration-high thrust while the relatively lower energy propellant is then ignited to provide a long duration-low thrust.

2. A power plant, which comprises a housing, a plurality of relatively flexible propellant cells slidably received in said housing for separately containing gelatinous propellants of relatively high and relatively lower energy values, stationary propellant flow splitter means in said housing and provided with relatively sharp inwardly facing tubular surfaces for puncturing said fuel cells, and a source of pressurized gas for initially applying a force to the propellant cell containing propellant of a relatively lower energy value to first move the cell containing higher energy propellant against the relatively sharp surfaces on the splitter means to puncture said cell and direct said propellant through the stationary splitter means in shaped columns for ignition followed by puncturing of the cell containing low energy propellant, the relatively high energy propellants being first ignited and providing a short duration-high thrust while the relatively lower energy propellant is then ignited to provide a long duration-low thrust.

3. A rocket engine, which comprises a housing having a bulkhead dividing said housing into forward and aft portions, stationary propellant flow splitter means adjacent one end of the housing aft portion, a plurality of flexible propellant cells in contact one with the other slidably received in said housing aft portion and one of said cells bearing against said bulkhead and another of said fuel cells bearing against said splitter means, a supply of high energy gelatinous monopropellant in the propellant cell contacting the splitter means, a supply of low energy gelatinous monopropellant in the propellant cell bearing against the bulkhead, a plurality of tubular inserts mounted on the splitter means and having relatively sharp surfaces facing said high energy propellant cell, and force applying means in the housing forward portion for exerting a force against the low energy propellant cell to drive the high energy cell against the sharp surfaces on the tubular inserts to pierce said cell and force the propellant in said cell through the splitter means in shaped columns for ignition, said force applying means then driving the low energy propellant cell into piercing contact with the tubular inserts to force the propellant therein through the splitter means in shaped columns for ignition, whereby a vehicle powered by said engine has relatively high thrust for climb and thereafter a relatively low thrust for cruise.

4. A rocket engine, which comprises a housing having a bulkhead dividing said housing into forward and aft portions, stationary propellant flow splitter means adjacent one end of the housing aft portion, a pair of flexible propellant bags abutting one another in the housing aft portion and slidably received therein, one of said bags containing high energy gel propellant and bearing at one end against the splitter means and the other bag containing low energy gel propellant and abutting at one end against the bulkhead, a plurality of inserts mounted on the splitter means and having relatively sharp surfaces facing the high energy propellant bag, a nozzle assembly connected to the housing aft portion rearwardly of the splitter means, means at the side of said splitter means opposite the high energy fuel cell for igniting propellant directly into said nozzle assembly, and a pressure vessel in the housing forward portion for directing a modulated gas flow into the housing aft portion and against the low energy propellant bag to force the high energy propellant bag into piercing contact with the sharp surfaces on the inserts to eject propellant from said bag through the inserts and splitter means in shaped columns for ignition and discharge from the nozzle assembly for providing a relatively short duration-high thrust for climb purposes, said gas then forcing the low energy propellant bag into puncturing contact with the inserts to force the propellant therein through the splitter means in shaped columns for ignition, thereby providing subsequent to ignition of the high energy propellant a relatively long duration-low thrust for cruise purposes.

References Cited in the file of this patent
UNITED STATES PATENTS

| | | |
|---|---|---|
| 2,637,161 | Tschinkel | May 5, 1953 |
| 2,700,337 | Cumming | Jan. 25, 1955 |
| 2,711,630 | Lehman | June 28, 1955 |
| 2,753,801 | Cumming | July 10, 1956 |
| 2,880,582 | Turansky et al. | Apr. 7, 1959 |
| 2,954,670 | Helus et al. | Oct. 4, 1960 |
| 2,971,097 | Corbett | Feb. 7, 1961 |
| 2,988,879 | Wise | June 20, 1961 |

FOREIGN PATENTS

| | | |
|---|---|---|
| 582,621 | Great Britain | Nov. 22, 1946 |